W. P. MAXSON.
HARVESTER.
No. 15,701.  Patented Sept. 9, 1856.
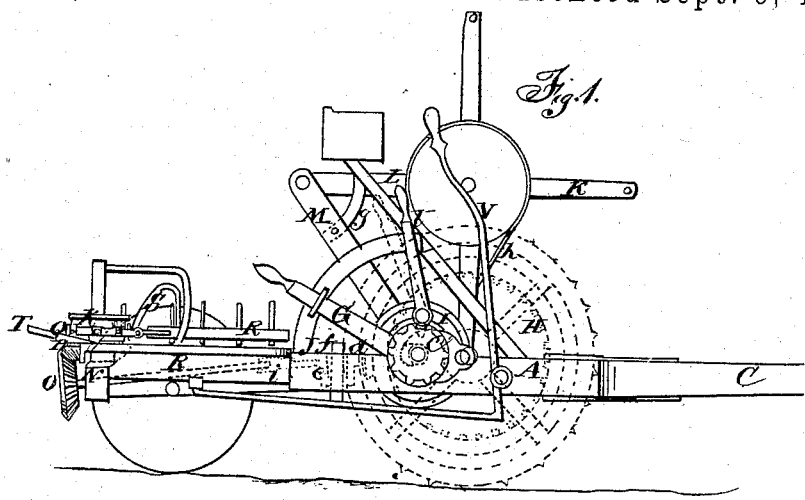
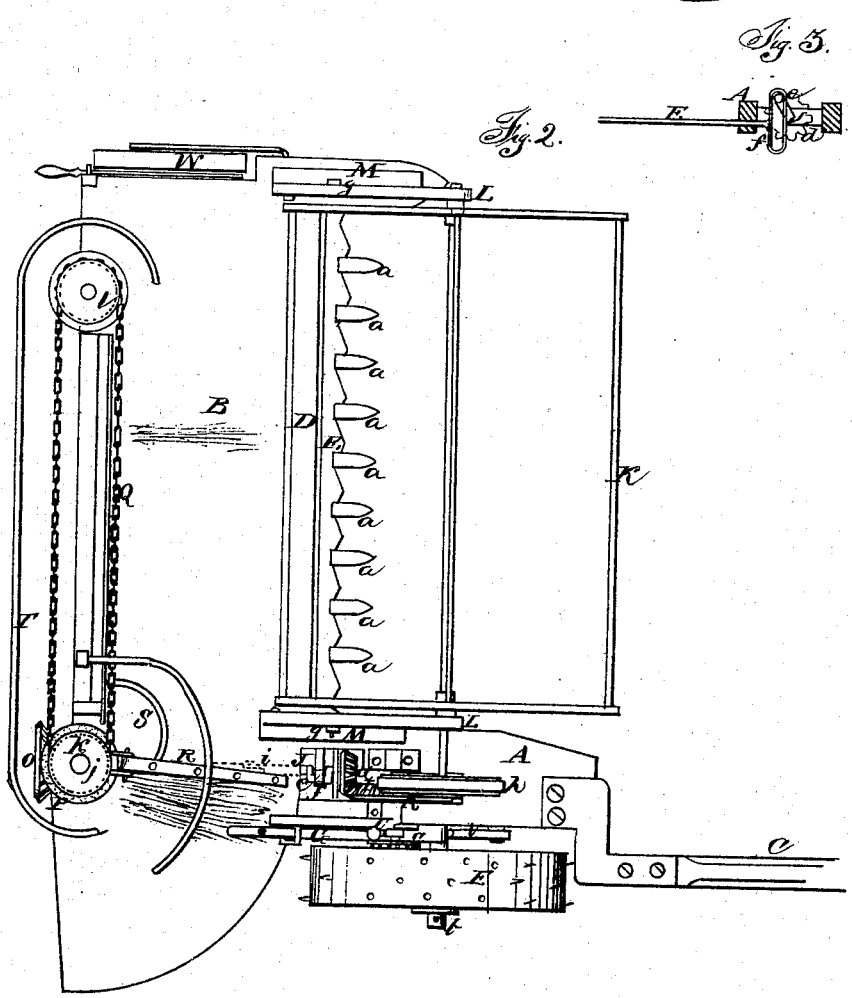

UNITED STATES PATENT OFFICE.

WILLIAM P. MAXSON, OF ALBION, WISCONSIN.

IMPROVED GRAIN AND GRASS HARVESTER.

Specification forming part of Letters Patent No. 15,701, dated September 9, 1856.

*To all whom it may concern:*

Be it known that I, W. P. MAXSON, of Albion, in the county of Dane and State of Wisconsin, have invented a new and Improved Grain and Grass Harvester; and I do hereby declare that the following is a full, clear, and exact description of the same, reference being had to the annexed drawings, making a part of this specification, in which—

Figure 1 is a side view of my improvement. Fig. 2 is a plan or top view of the same. Fig. 3 is a detached view of the crank-movement by which the sickle is operated.

Similar letters of reference indicate corresponding parts in the several figures.

To enable those skilled in the art to fully understand and construct my invention, I will proceed to describe it.

A represents the main frame of the machine, to which the platform B is attached in any proper manner; and C is the draft-pole, which is attached to the front end of the platform.

D is the finger-bar, which is attached to the front end of the platform B; and $a$ are the fingers, which are attached to the finger-bar, said fingers being slotted and having a sickle, E, fitted and working in or through them, the sickle having teeth of the usual triangular or saw-tooth form, as plainly shown in Fig. 2.

F represents the driving-wheel, which works on an arm, $b$, of a lever, G, which is attached to the outer side of the main frame A. This lever is slotted, and a screw passes through the slot into the side of the frame, so that said wheel may be thrown in and out of gear with a pinion, $c$, which gears into a toothed wheel, H, attached to the inner side of the driving-wheel. The pinion $c$ is attached to a small shaft, H', which is placed on the main frame H, and has a bevel-wheel, I, on its inner end. The wheel I gears into a bevel-pinion, $d$, at the end of a shaft, J, which has a crank, $e$, upon it, said crank working in a loop, $f$, which is attached to one end of the sickle F. The loop and crank are more particularly shown in Fig. 3.

K represents a reel, the shaft of which has its bearings in arms L L, which are pivoted to supports M M, one of which is attached to the main frame and the other to the outer end of the platform B. The arms L L are supported by segment-brackets $g\ g$, and may be raised and lowered, so that the reel may be adjusted to the desired height. The reel K is driven by a belt, $h$, from the shaft $H^2$.

The shaft J is connected by a forked coupling, $i$, with a shaft, N, which has a bevel-wheel, O, on its outer end. This bevel-wheel O gears into a corresponding wheel, P, which is placed on a small upright shaft, $j$, at the back part of the platform B. On the shaft $j$ a pulley, $k$, is placed, said pulley being secured to the wheel P.

To the back part of the platform, and near its outer end, there is attached a pulley, $l$, and an endless chain, Q, passes around the two pulleys $k\ l$, said chain having a rake, R, attached to it. A curved rod, S, is also attached to the chain Q just back of the rake R, said rod serving as a bearing for the rake.

T represents a rod or guide attached to the back part of the platform B, and serving as a rest or support for the rake while passing around the back of the platform.

U is a lever, which is pivoted to the outer side of the main frame A. The lower end of this lever catches into the lever G.

The operation will be readily seen. As the machine is drawn along the sickle E is vibrated by means of the crank $e$ working in the loop $f$, and the cut grain is spread upon the platform B by means of the reel K, and the cut grain is raked from the platform by means of the rake R, which, as it passes over the platform, pushes the cut grain off the back end with the heads toward the uncut or standing grain. The sickle E is raised and lowered by operating the lever G, and the wheel H is thrown in and out of gear with the pinion $c$ by operating the lever U.

The raking attachment may be thrown out of gear with the driving parts, when desired, by operating a lever, V, which disconnects the forked coupling $i$ of the two shafts N J. The outer end of the platform B is supported by a wheel, W.

When the machine is used as a grass-harvester the platform B and raking attachment are removed.

Having thus described my invention, what I claim as new, and desire to secure by Letters Patent, is—

The wheel H, attached to the driving-wheel F, in combination with the curved sliding lever G (on which the driving-wheel is hung) and straight lever U, when arranged to operate in the manner and for the purpose set forth.

WM. P. MAXSON.

Witnesses:
P. M. CHILD,
R. R. CHILD.